Dec. 15, 1953  R. E. BAREFORD  2,662,956
MANOMETRIC ACCELEROMETER
Filed May 3, 1952
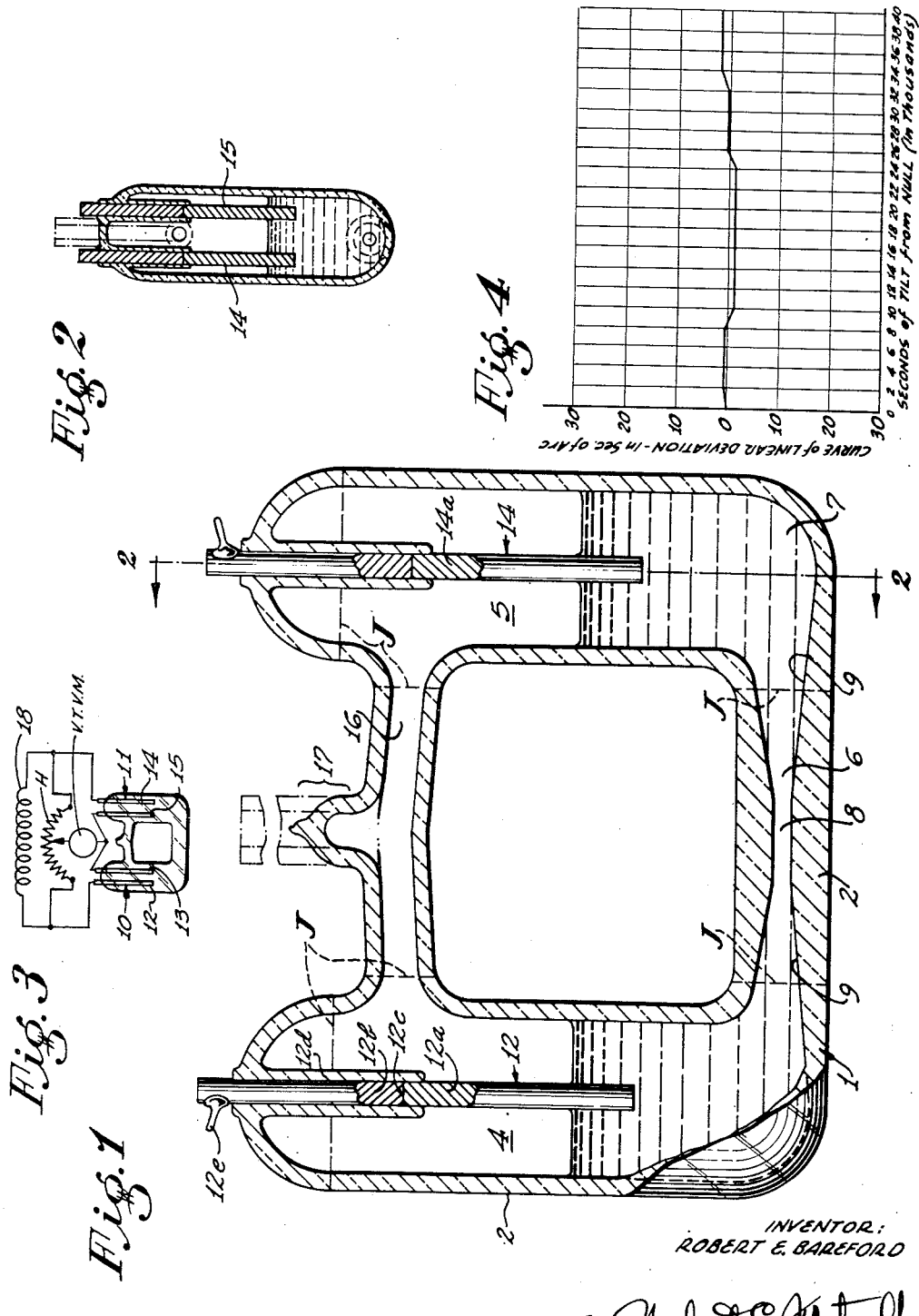
INVENTOR:
ROBERT E. BAREFORD
By Herbert E. Metcalf
HIS PATENT ATTORNEY Patented Dec. 15, 1953

2,662,956

UNITED STATES PATENT OFFICE 2,662,956

MANOMETRIC ACCELEROMETER

Robert E. Bareford, Burbank, Calif., assignor to Northrop Aircraft, Inc., Hawthorne, Calif., a corporation of California Application May 3, 1952, Serial No. 285,961

8 Claims. (Cl. 201—57)

1

The present invention relates to a device for indicating acceleration and attitude of a body on which it is mounted, for use, for instance, on an air borne vehicle or missile.

The device is of the type in which the displacement of liquid in the instrument affects the resistance of an electric circuit including an indicating instrument calibrated to show the angle of inclination of the body on which the instrument is mounted, or the acceleration of the body, or both the acceleration and angle of inclination.

Various instruments of the kind to which the invention relates have been proposed, the instruments often containing a body of mercury the movement of which completed contacts in the electrical circuit of the instrument and effected the operation of an indicating instrument.

A common fault of known types of accelerometers and levels is the erratic character of the readings given by the instrument due to lack of control of the mercury or liquid.

It is the general object of my invention to provide an instrument for indicating acceleration, deceleration or angles of tilt of a body on which it is mounted, the readings of the instrument being more linear, owing in part to control exercised on the movement of liquid in the device, than those afforded by other instruments.

Another object of my invention is to provide an instrument of the type described which will operate over a greater range of movement than known instruments of the same general type.

A still further object of my invention is to provide an accelerometer and level indicator of simple and strong construction providing accurate readings.

Yet another object of my invention is to provide a sensitive and accurate instrument for the purpose described which is free from deterioration in use.

A still further object of my invention is to provide an instrument in which the parts are permanently sealed in place thus avoiding the risk of faulty functioning due to parts working loose.

With the above and other objects in view the invention comprises an accelerometer and level indicating instrument having a body of insulating material provided with chambers mounted vertically in spaced relation, the chambers being connected at their lower ends by a conduit and having electrodes projecting into the chambers and into an electrolyte filling the lower ends of the chambers and said conduit. The electrodes are connected in a suitable bridge circuit and the value of acceleration or deceleration or angle of tilt is effective to produce a signal which may be indicated by an instrument in the circuit.

Still further features and advantages of the invention will hereinafter appear from the following specification read with reference to the accompanying drawings which illustrate an embodiment of the invention at present thought preferable to me.

In the drawings:

Figure 1 is a central vertical section through the device of the invention.

Figure 2 is a cross-section on the line 2—2 of Figure 1, drawn on a smaller scale.

Figure 3 is a schematic diagram showing the instrument connected in a suitable bridge circuit, electrodes being shown for clarity spaced in the longitudinal plane of the instrument although this is not their actual arrangement.

Figure 4 is a graph showing readings obtained from the device when used as a level and showing the linearity of the readings.

In Figure 1 the numeral 1 generally indicates the device, which comprises a first tubular member 2, a base section 3 and a second tubular member 3, all parts of the instrument except those included in an electrical circuit later described, being formed of non-conductive material.

The tubular members form identical chambers 4 and 5 respectively spaced apart on the base member and connected by a conduit 6. The lower portions of the chambers 4 and 5 and conduit 6 are filled with a suitable liquid 7.

The desirable characteristics of the liquid used include electrical stability under variations of temperature, a suitable liquid was found to be a .02 molar concentration of magnesium nitrate using ethanol as a solvent, the formula being .02 M. $Mg(NO_3)_2.6H_2O$ in 95% ethanol. Other suitable liquids may obviously be used.

The form of the conduit 6 is of particular importance since it controls the flow of liquid from one chamber to the other consequent on a difference of level therein due to a tilt of the instrument or a sudden change in the rate of movement of a vehicle on which the instrument is carried.

In Figure 1 the conduit is shown, by way of example, with a restricted throat 8 and identically flared sections 9 connecting the throat to the tubular chambers 4 and 5, it has been found in practice that an angle of flare of about 15° provides a smooth flow of liquid through the conduit 6.

The diameter of the throat 8 is determined by the desired degree of damping of the flow of liquid, and the throat or portion of minimum diameter of the conduit 6 may be positioned where required, for instance the best positions for maximum dynamic linearity of flow of the liquid is to arrange the flared sections of the conduit just below the electrodes generally indicated at 10 and 11 in each vertical chamber 4 and 5, this arrangement however increases the height of the instrument.

The electrodes 10 and 11 are arranged in pairs 12, 13, and 14, 15 (see Figure 3) and their construction is identical, consequently only electrode 12 will be specifically described. Since the end of the electrode projecting into the electrolyte should be chemically inert, the lower end 12a is formed of a chemically pure platinum rod, preferably including 10% iridium to increase its mechanical strength, and since the upper ends of the electrodes are sealed into the cap portion forming the top of the chambers, which are conveniently made of glass, the upper end 12b is formed of a tungsten rod electrically welded at 12c to the lower end 12a. The upper end 12b is fitted into and welded to a glass sleeve 12d which projects over the welded junction 12c to protect the tungsten from the electrolyte, the sleeve in turn being welded to the cap portion of the chamber. To facilitate attachment of leads to the electrodes lug 12e is soldered to the upper end of rod 12b. It should be noted that the platinum end of the electrodes are immersed to an equal extent in the liquid in the chambers while the instrument remains level or is being moved in the direction of its longitudinal axis at a constant speed.

In order to equalize the pressure in the upper part of the chambers 4 and 5, a conduit 16 is provided in the cap portion to extend between them. The conduit 16 is also used, when producing the device, to introduce the liquid therein, a short neck 17 being provided for this purpose, the neck thereafter being sealed off as indicated in Figure 1. Preferably the conduit is sloped downward from the mid-point of its length in order to facilitate drainage of any liquid therefrom that may enter the passage due to violent movement of the vehicle on which it is carried, this slope may be about 15°.

The device is advantageously made entirely of Pyrex glass, the various parts being molded or cast to specification and fused together as indicated by the dotted joint lines in Figure 1.

The instrument is incorporated in preferably an A. C. Wheatstone resistance bridge circuit as shown in Figure 3, in which the secondary of a transformer is indicated at 18 which may be used to supply 2.5 volts at 400 c. p. s. to the legs of the circuit. The electrodes 12 and 13 in chamber 4 of the device of my invention are connected in one leg of the circuit, and the electrodes 14, 15 in chamber 5 are connected in the opposite leg of the bridge.

The midpoint of a connection between electrodes 13 and 15 is connected through a vacuum tube voltmeter (V. T. V. M.) to helipot H which is connected between the arms of the bridge circuit and is the equivalent after initial adjustment of the usual matched resistances.

The functioning of the instrument of my invention is dependent on the variation of resistance in the arms of the bridge circuit by the extent of immersion of the electrodes in one chamber as compared with the immersion of the electrodes in the other chamber.

While the instrument remains level the electrodes in both chambers will be immersed to an equal extent in the liquid in the chambers and therefore the resistance in the arms of the Wheatstone bridge circuit will balance and no reading will be shown by the voltmeter (V. T. V. M.). If the device is tilted in its vertical plane the level of the liquid will of course rise in one chamber and fall in the other chamber thus unbalancing the bridge circuit and giving a reading on the scale of the voltmeter.

Figure 4 is a graph of a test on the instrument when used as a level, seconds of arc of tilt being plotted against linear deviations of voltage. It will be noted that the deviations from linear are very small and the instrument gives a much better reading than obtainable from known instruments of the same general type.

When the instrument is used to measure acceleration or deceleration in the direction of its longitudinal axis the inertia of the liquid will cause flow from the leading chamber to the other thus causing unbalance of the Wheatstone bridge. The unbalance of the bridge circuit could of course be utilized to afford a signal controlling corrective mechanisms of any suitable type if required.

The sensitivity of the instrument is shown by the fact that under test it was determined that an angle of tilt as small as one second of arc was detected while the range of the instrument as constructed extended to 14°. The range of the instrument obviously will depend on the depth to which the electrodes are immersed in the electrolyte in the horizontal position of the instrument.

When used as an accelerometer, the instrument illustrated was found to detect an acceleration of .0005% of 1"g(K)" while the range extended to 25% of 1"g(K)".

The outstanding features of the instrument of my invention as proved by test are linearity, sensitivity, and stability achieved by a structure of simple design.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What I claim is:

1. An electrically operated instrument for indicating acceleration and attitude, including: chambers formed of insulating material and spaced from one another in a horizontal plane; conduit means connecting the lower portions of said chambers, said conduit means adapted to be filled and said chambers to be partly filled with electrolyte; and separate electrode means rigidly mounted in said chambers and projecting into the electrolyte when placed in the instrument in each chamber to an extent dependent on the vertical displacement of the electrolyte in the chambers so that the resistance of an electric path including said electrode means and electrolyte is varied by the extent to which the electrode means are immersed in the electrolyte.

2. An electrically operated instrument for indicating acceleration and attitude, including: chambers formed of insulating material spaced from one another in a horizontal plane; conduit means connecting the lower portions of said chambers, said conduit means adapted to be filled and said chambers to be partly filled with electrolyte; separate electrode means rigidly mounted in said chambers and projecting into the electrolyte when placed in the instrument in each chamber to an extent dependent on the vertical displacement of the electrolyte in the chambers so that the resistance of an electric path including said electrode means and electrolyte is varied by the extent to which the electrode means are immersed in the electrolyte; a cap portion of insulating material closing the upper ends of said chambers; and conduit means connecting the upper ends of said chambers.

3. An electrically operated instrument for indicating acceleration and attitude including: identical tubular chambers of insulating material projecting upwardly from a base member and spaced apart thereon; conduit means connecting the lower portions of said chambers, said conduit means adapted to be filled and said chambers to be partly filled with electrolyte; a cap portion of insulating material closing the upper ends of said chambers; separate electrode means rigidly mounted in the cap member and projecting downwardly into said electrolyte in each chamber to an extent dependent on the vertical displacement of the electrolyte in the chambers so that the resistance of an electric path including said electrode means and electrolyte is varied by the extent to which the electrode means are immersed in the electrolyte; and a passage through said cap portion connecting the upper ends of said chambers.

4. An electrically operated instrument for indicating acceleration and attitude, including: tubular chambers of insulating material projecting upwardly from a base portion of insulating material and spaced apart thereon; a conduit connecting the lower portions of said chambers, said conduit adapted to be filled and said chambers to be partly filled with electrolyte, said conduit having a restricted portion to provide a predetermined damping of the flow of liquid at times from one chamber to the other; and separate electrode means rigidly mounted in said chambers and projecting into the electrolyte when placed in the instrument in each chamber to an extent dependent on the vertical displacement of the electrolyte in the chambers so that the resistance of an electric path including said electrode means and electrolyte is varied by the extent to which the electrode means are immersed in the electrolyte.

5. An electrically operated instrument as set forth in claim 4 and in which the restricted portion of the bore of said conduit is connected by sloped portions to the bore of said tubular chambers to provide a smooth flow of the electrolyte through the conduit, the angle of said sloped conduit portions being less than about 15°.

6. An electrically operated instrument for indicating acceleration and attitude, including: tubular chambers of insulating material projecting upwardly from a base portion of insulating material and spaced apart thereon; a conduit connecting the lower portions of said chambers; an electrolyte filling said conduit and partly filling the chambers; a plurality of spaced electrode means rigidly mounted on each chamber and projecting into the electrolyte therein; a cap portion of insulating material closing the upper ends of said chambers; and a passage through said cap portion connecting the upper ends of said chambers.

7. An instrument as set forth in claim 6 and in which each of said electrodes comprises an upper portion, a sleeve enclosing said upper portion and formed from a material resistant to and protecting the upper portion of the electrode from the electrolyte, and a lower electrode portion of chemically inert material.

8. An instrument as set forth in claim 6 and in which said passage in the cap is sloped downwardly from a central portion and is initially provided with a filling neck at that portion for the introduction of electrolyte said neck being subsequently sealed.

ROBERT E. BAREFORD.

References Cited in the file of this patent

UNITED STATES PATENTS

| Number | Name | Date |
| --- | --- | --- |
| 1,317,072 | Carlier | Sept. 23, 1919 |
| 2,067,467 | Urfer | Jan. 12, 1937 |